(12) United States Patent
Saklatvala (10) Patent No.: US 9,767,362 B2
(45) Date of Patent: Sep. 19, 2017

(54) MATCHING A FEATURE OF CAPTURED VISUAL DATA

(71) Applicant: LONGSAND LIMITED, Cambridge (GB)

(72) Inventor: George Saklatvala, Cambridge (GB)

(73) Assignee: Aurasma Limited, Bracknell (GB)

( * ) Notice: Subject to any disclaimer, the term of this patent is extended or adjusted under 35 U.S.C. 154(b) by 0 days.

(21) Appl. No.: 14/649,633

(22) PCT Filed: Dec. 7, 2012

(86) PCT No.: PCT/EP2012/074856
§ 371 (c)(1),
(2) Date: Jun. 4, 2015

(87) PCT Pub. No.: WO2014/086435
PCT Pub. Date: Jun. 12, 2014

(65) Prior Publication Data
US 2015/0347851 A1    Dec. 3, 2015

(51) Int. Cl.
*G06K 9/00* (2006.01)
*G06T 11/60* (2006.01)
(Continued)

(52) U.S. Cl.
CPC ..... *G06K 9/00671* (2013.01); *G06F 17/3028* (2013.01); *G06F 17/30259* (2013.01); *G06F 17/30486* (2013.01); *G06K 9/00979* (2013.01); *G06K 9/4671* (2013.01); *G06K 9/6202* (2013.01); *G06T 11/60* (2013.01)

(58) Field of Classification Search
CPC ........... G06F 17/30259; G06F 17/3028; G06F 17/30486; G06F 3/14; G06K 9/00979; G06K 9/4671; G06K 9/6202; G06K 9/00671; G06K 9/34; G06T 11/60; G06T 17/00; A61B 8/485; G06Q 30/02; G06Q 30/0251; G06Q 30/0261
See application file for complete search history.

(56) References Cited

U.S. PATENT DOCUMENTS 6,463,433 B1    10/2002  Baclawski
7,941,442 B2 *   5/2011  Li ...................... G06F 17/3025
                                                      707/780
(Continued)

FOREIGN PATENT DOCUMENTS

CN            101101505        1/2008

OTHER PUBLICATIONS

Distributed Locality Sensitivity Hashing Wadhwa, S.; Gupta, P. Consumer Communications and Networking Conference (CCNC), 2010 7th IEEE Year: 2010 pp. 1-4.*
(Continued)

*Primary Examiner* — Edward Park
*Assistant Examiner* — Michael Vanchy, Jr.
(74) *Attorney, Agent, or Firm* — Trop Pruner & Hu P.C.

(57) ABSTRACT

Techniques for matching a feature of captured visual data are described in various implementations. In one example implementation, a server from among plural servers matches a feature of captured visual data of a physical target received from an electronic device with features of one of a plurality of partitions. Based on the matching, an object is identified that corresponds to the captured visual data.

16 Claims, 4 Drawing Sheets

(51) Int. Cl.
G06K 9/62 (2006.01)
G06K 9/46 (2006.01)
G06F 17/30 (2006.01)

(56) References Cited

U.S. PATENT DOCUMENTS

| | | |
|---|---|---|
| 2008/0263042 A1 | 10/2008 | Li et al. |
| 2011/0102605 A1* | 5/2011 | Hannaford .......... G06F 17/3087 348/207.1 |
| 2012/0027305 A1 | 2/2012 | Kim |
| 2012/0057032 A1 | 3/2012 | Jang |
| 2012/0062595 A1 | 3/2012 | Oh |

OTHER PUBLICATIONS

Mobile Visual Search Girod, B.; Chandrasekhar, V.; Chen, D.M.; Ngai-Man Cheung; Grzeszczuk, R.; Reznik, Y.; Takacs, G.; Tsai, S.S.; Vedantham, R. Signal Processing Magazine, IEEE Year: 2011, vol. 28, Issue: 4 pp. 61-76.*

Duan, L., et. al., Multi-Channel Compact Visual Descriptor with Adaptive Channel Learning, Mar. 2011, International Organization for Standardization, ISO/IEC JTC1/SC29/WG11, Coding of Moving Pictures and Audio, 14 pages.

Girod, B., et al., Mobile Visual Search: Architectures, Technologies, and the Emerging MPEG Standard, 2011, IEEE Computer Society, pp. 86-94.

Girod, B., et. al., Mobile Visual Search—Linking the Virtual and Physical Worlds, Jun. 15, 2011, IEEE Signal Processing Magazine, pp. 61-76.

He, J., et. al., Mobile Product Search with Bag of Hash Bits and Boundary Reranking, 2012, IEEE, pp. 3005-3012.

International Search Report & Written Opinion, Jul. 18, 2013, PCT Patent Application No. PCT/EP2012/074856, 14 pages.

Ji, R., et. al., Learning to Distribute Vocabulary Indexing for Scalable Visual Search, Jan. 2013, IEEE Transactions on Multimedia, vol. 15, No. 1, pp. 153-166.

Loxam, J., et. al., An Intelligent Method of Determining Trigger Items in Augmented Reality Environments, May 10, 2012, U.S. Appl. No. 13/468,246, 76 pages.

Takacs, G., et al., Outdoors Augmented Reality on Mobile Phone using Loxel-Based Visual Feature Organization, Oct. 2008, MIR' 08, 8 pages.

Tang, F., et al., TouchPaper—An Augmented Reality Application with Cloud-Based Image Recognition Service, Sep. 6, 2012, 4th International Conference on Internet Multimedia Computing and Service, HPL-2012-131R1, 5 pages.

Wadhwa, S., et. al., Distributed Locality Sensitivity Hashing, 2010, IEEE Communications Society, IEEE CCNC 2010 Proceedings, 4 pages.

Wei Guan, S.Y., et al., Efficient Matchings and Mobile Augmented Reality, Jan. 2012, ACM Transactions on Multimedia Computing, Communications and Applications, vol. 1, No. 1, Article 1, 15 pages.

Zhang, S., et. al., Building Contextual Visual Vocabulary for Large-Scale Image Applications, Oct. 2010, MM' 10, pp. 501-510.

* cited by examiner

MATCHING A FEATURE OF CAPTURED VISUAL DATA

BACKGROUND

Augmented reality provides a presentation of a physical, real-world environment that is augmented by additional information, such as audio data, video data, image data, text data, and so forth. For example, a camera of an electronic device can capture the image or video of a physical target. An augmented reality presentation of the physical target can then be displayed by the electronic device, where the augmented reality presentation of the physical target includes the image or video of the physical target, along with additional data such as any of those listed above.

BRIEF DESCRIPTION OF THE DRAWINGS

Some embodiments are described with respect to the following figures.

DETAILED DESCRIPTION

Generally, an augmented reality presentation can be created in response to capture of an image or video of a real-world physical target. As examples, the physical target can be a picture in a magazine or newspaper, a picture on a product box, a geographic landmark, and so forth. A user can point the camera of an electronic device at the physical target, and in response to the captured visual data (image data or video data) of the physical target, the electronic device can produce an augmented reality presentation that is based on the physical target.

The augmented reality presentation can include a visual output containing an image or video triggered based on the captured physical target, augmented with additional information (hereinafter referred to as "augmented reality content"). The augmented reality content can include audio data, further video data, further image data, text data, and so forth, that is added to the visual output. The visual output of the captured physical target can include an image or video of the captured physical target (the entirety of the captured physical target or a portion of the captured physical target), or a representation of the captured physical target, or different visual content. In cases where the visual output contains an image or video of the captured physical target or representation of the captured physical target, the further video data, further image data, and/or text data can overlay the visual output, while the audio data can be output as sound along with the visual output. An augmented reality presentation can thus be in the form of a multimedia presentation that can include the visual output of the captured physical target in addition to augmented reality content.

As an example, the electronic device when pointed at a given picture in a newspaper or magazine may cause an online electronic game to start playing. The given picture in the newspaper or magazine can be a game character, an advertisement, or other information associated with the online electronic game. The capture of such game character or other game information by the camera of the electronic device provides a trigger to the electronic device to start the online electronic game. As another example, the captured physical target can be a geographic landmark. Based on the capture of the geographic landmark, an augmented reality presentation can be triggered that can provide a virtual tour of the geographic landmark, augmented with image or video data, audio data, and/or text data that explain the historical significance of various aspects of the geographic landmark.

As a further example, the electronic device can capture a chess board, which can cause a chess game to come to life in an augmented reality presentation such that a user can start playing chess. As yet another example, the electronic device can capture a canvas, which can trigger an augmented reality presentation to allow paint brushes to be virtually made on the canvas. In other examples, other types of augmented reality presentations can be triggered by the capture of other types of physical targets.

In deciding whether or not to trigger an augmented reality presentation in response to captured visual data of a physical target, an object recognition process is performed in which the features of the captured visual data can be compared to corresponding features of objects contained in a feature database. The process of comparing features of the captured visual data to corresponding features of objects in the feature database is referred to as a feature matching process.

In the ensuing discussion, reference is made to comparing features of a captured image to features of objects contained in the feature database. Note, however, that techniques or mechanisms according to some implementations can also be applied to comparing features of captured video or other visual data to features of objects contained in the feature database.

A system can include a relatively large number of objects (in the feature database) that may potentially have to be compared to captured images. If a feature matching process is performed at an electronic device having relatively low processing power, the feature matching process can take a relatively long time to complete if there are a relatively large number of objects to which the captured image is to be compared.

An electronic device can also have constraints on its storage capacity. As a result, the electronic device may be able to store just a subset of the objects in the feature database. To complete the feature matching process, the electronic device may have to repeatedly access a remote location to retrieve successive different subsets of the feature database, which adds to overall latency. In addition, storing portions of the feature database in the storage of the electronic device can reduce the electronic device's storage capacity for other data.

Moreover, if feature matching is performed at the electronic device, descriptors of features of objects may have to be loaded into the memory of the electronic device when an application (such as an augmented reality application) is started up. Loading a large number of feature descriptors into memory during application startup can lead to relatively very long startup times for the application, which can degrade user experience.

In accordance with some implementations, rather than perform matching of a captured image to objects of a feature database for augmented reality applications at the electronic device, the matching can instead by performed on a distributed arrangement of servers that are separate from the electronic device. A server can refer to any computing device that can perform respective computation tasks.

In the ensuing discussion, reference is made to feature matching processes for augmented reality applications. However, feature matching processes according to some implementations can also be used in other applications, such as object detection, object classification, object recognition, object tracking, and so forth.

In accordance with some implementations, to improve overall performance of a feature matching process, features of objects can be grouped into multiple partitions, and the partitions can be distributed across multiple servers. As a result, different servers can include or have access to corresponding different partitions of the feature database. Each server has access to a respective feature partition (or multiple respective feature partitions).

The partitioning groups features that are considered to be similar to each other based on some similarity metric. As discussed further below, the grouping of object features can be based on hash values computed for the features, where features with similar hash values (hash values that are relatively close to each other) are considered to be similar to each other. In some implementations, rather than divide objects into respective partitions, where different groups of objects are provided in the respective different partitions, features are divided among the partitions, such that features for a given object may potentially be spread across multiple partitions (and thus multiple servers). Grouping similar features together such that they can be processed by the same server allows for more efficient feature matching operations.

As noted above, the partitioning and distribution can cause features of a given object to be split across multiple feature partitions. Thus, it is possible for a first feature of the given object to be in a first feature partition (provided at a first server), a second feature of the given object to be in a second feature partition (provided at a second server), and so forth. During a feature matching process, multiple servers can perform feature matching of features of a captured image to respective features in respective feature partitions.

Note also that a server can perform feature matching processes for features of images captured by multiple electronic devices. For example, a first server can perform feature matching processes for features of images captured by multiple electronic devices, a second server can perform feature matching processes for features of the images captured by the multiple electronic devices, and so forth. In a specific example, assume that a first captured image (as captured by a first electronic device) has feature 1 and feature 2. Similarly, a second captured image (captured by a second electronic device) has feature X and feature Y. In an example, it is assumed that feature 1 (of the first captured image) and feature X (of the second captured image) map to a first feature partition, whereas feature 2 (of the first captured image) and feature Y (of the second captured image) map to a second feature partition. In this example, the corresponding feature matching processes can involve the following:

a first server matches feature 1 of the first captured image to features in the first feature partition, and matches feature X of the second captured image to features of the first feature partition; and a second server matches feature 2 of the first captured image to features of the second feature partition, and matches feature Y of the second captured image to features of the second feature partition.

After a feature matching process performed at multiple servers has completed, the matched features (produced by the multiple servers) for a given request-object pair are then combined. A request-object pair includes (1) a request that initiated the feature matching process, and (2) an object in the feature database identified by the servers as containing features that match the features of the captured image accompanying the request. In some implementations, after combining the matched features of the given request-object pair, the feature matching process can further determine a match score for the given-request pair, where the match score provides an indication of a degree of match between the captured image and the corresponding object. If the match score indicates that the corresponding object is considered to be a match for the captured image, then the corresponding object can be returned to a requestor.

Figure 1:
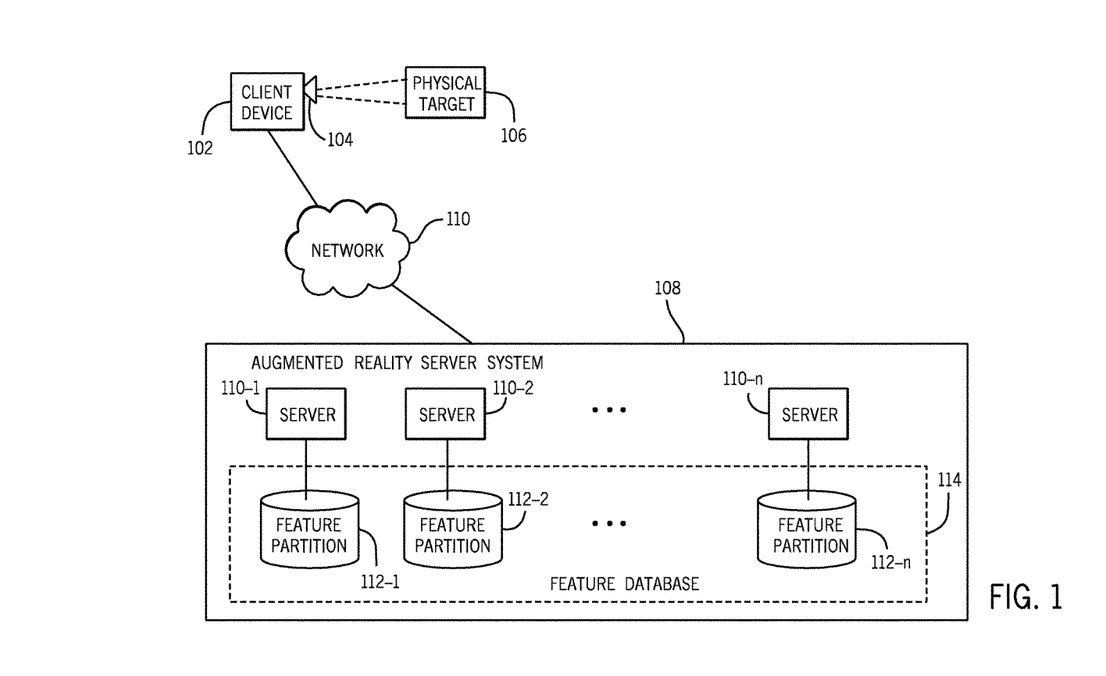
FIG. 1 illustrates an example arrangement that includes a client device and an augmented reality server system having servers across which a feature database is distributed, in accordance with some implementations.

FIG. 1 is a block diagram of an example arrangement that includes a client device 102 and an augmented reality server system 104. The client device 102 has a camera 104 that can capture an image of a physical target 106. Although FIG. 1 depicts just one client device 102, it is noted that there can be multiple client devices in other examples.

Examples of the client device 102 can include a notebook computer, a desktop computer, a tablet computer, a personal digital assistant (PDA), a smart phone, or any other electronic device that is able to capture an image of the physical target 106 and which is able to present an augmented reality presentation (such as in a display of the client device 102, not shown in FIG. 1).

The captured image of the physical target 106 can be sent by the client device 102 with a request to an augmented reality server system 108 over a network 110. An example of the network 110 can include a local area network (LAN), a wide area networks (WAN), the Internet, and so forth. The request is a request to match the captured image to object(s) of a feature database 114 in the augmented reality server system 108.

The augmented reality server system 108 has multiple servers 110-1, 110-2, and 110-$n$, where n is greater than or equal to 2. The servers 110-1 to 110-$n$ are able to access respective feature partitions 112-1, 112-2, and 112-$n$, respectively. Each feature partition 112-$i$ (i being in the range between 1 and n) includes a respective group of features. The feature partitions 112-1 through 112-$n$ together form the feature database 114.

Upon receiving a request from the client device 102, the augmented reality server system 108 is able to extract the features of the captured image accompanying the request, and can partition the features of the image for processing by respective ones of the servers 110-1 to 110-$n$.

The servers 110-1 through 110-$n$ depicted in FIG. 1 are used to perform feature matching (to match features of the image accompanying the request with features of respective objects in the feature database 114). The augmented reality server system 108 can further include other types of processing modules to perform additional tasks, which are discussed further below.

Figure 2:
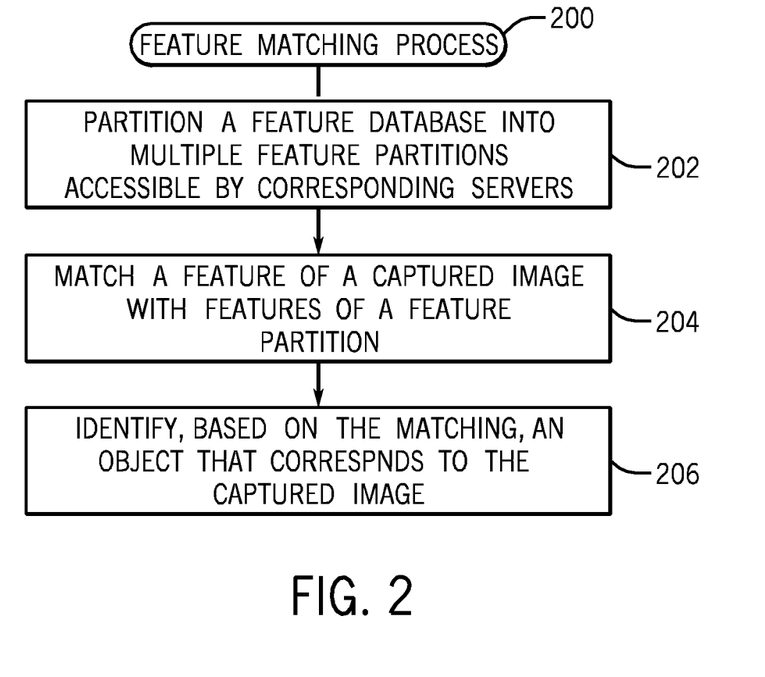
FIG. 2 is a flow diagram of a feature matching process for matching a feature of an image to features of a feature database, in accordance with some implementations.

FIG. 2 is a flow diagram of a feature matching process 200 according to some implementations. The process 200 can be performed by the augmented reality server system 108, for example.

The process 200 partitions (at 202) the feature database 114 into multiple feature partitions (112-1 through 112-$n$) accessible by corresponding servers 110-1 through 110-$n$.

The process 200 matches (at 204) a feature of a captured image accompanying a request received from the client device 102 with features of a corresponding feature partition 112-$i$. The matching performed at 204 can be performed by a corresponding server 110-$i$. If the captured image includes multiple features, then it is possible that multiple servers (from among 110-1 through 110-$n$) can be involved in matching such features of the image to corresponding features of the feature partitions. For example, a captured image received with a request from the client device 102 may include two features. These two features may be mapped to two different feature partitions (e.g. 112-1 and 112-2). In this example, a first image feature would be provided to server 110-1 and a second image feature would be provided to server 110-2 for matching to respective features of the feature partitions 112-1 and 112-2.

The process 200 next identifies (at 206), based on the matching at 204, an object that corresponds to the image. This identified object can be returned to the client device 102 to trigger an augmented reality presentation at the client device 102. Note that it may be possible that the feature matching process 200 of FIG. 2 produces multiple matching objects, in which case multiple objects can be provided from the augmented reality server system 108 back to the client device 102.

Figure 3:
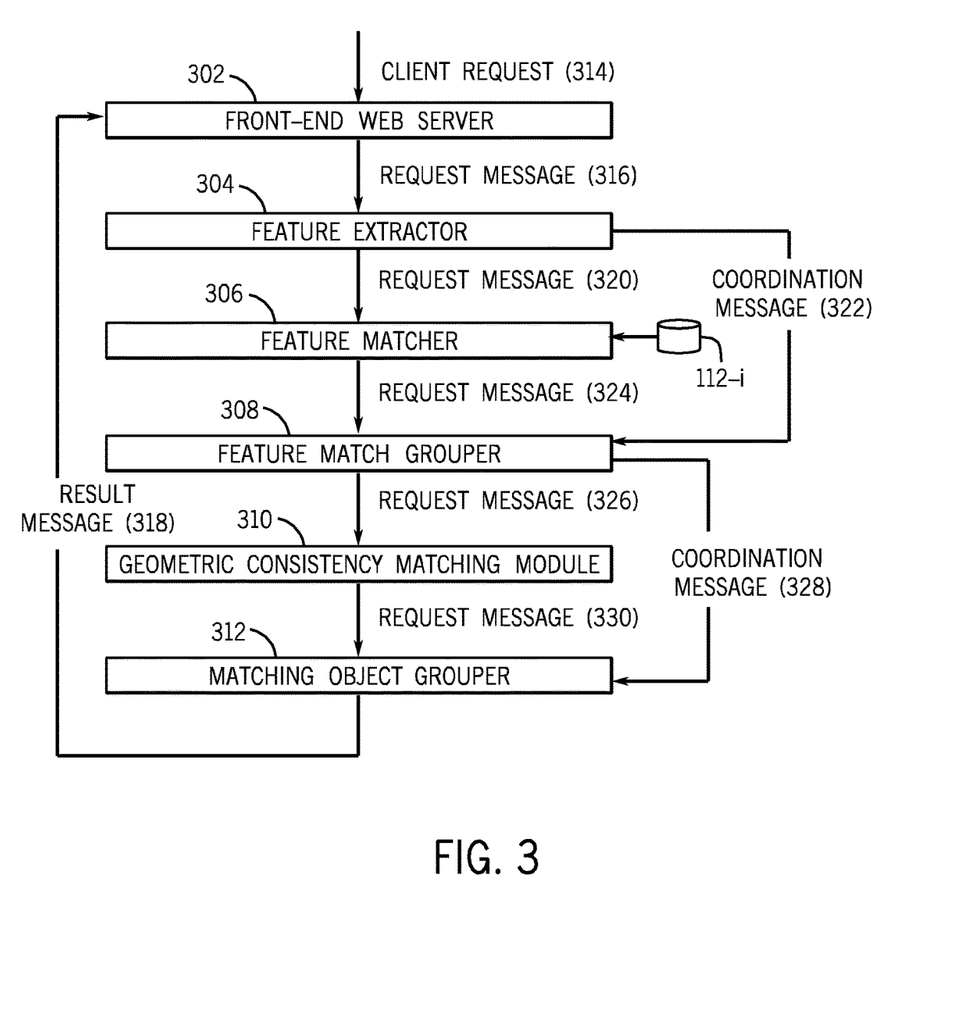
FIG. 3 is a schematic diagram illustrating various processing modules of an augmented reality server system according to some implementations.

As noted above, there can be multiple types of processing modules in the augmented reality server system 108. As shown in FIG. 3, one type of processing module includes a feature matcher 306, which can perform matching of a feature of a captured image with features of a feature partition. Although just one feature matcher 306 is shown, it is noted that there can be multiple feature matchers 306, which can be implemented in the respective servers 110-1 through 110-$n$ of FIG. 1.

Other types of processing modules include a front-end web server 302, a feature extractor 304, feature match grouper 308, a geometric consistency matching module 310, and a matching object grouper 312. There can be one or multiple front-end web servers 302, one or multiple feature extractors 304, one or multiple feature match groupers 308, one or multiple geometric consistency matching modules 310, and one or multiple matching object groupers 312.

The different types of processing modules can be implemented in respective distinct computer servers. Alternatively, some combination of the different types of processing modules can be implemented on a common computer server. Although specific types of processing modules are shown in FIG. 3, in other examples, alternative or different processing modules can be used.

A front-end web server 302 receives a client request 314 (to perform a match of an image of a captured physical target) from the client device 102. The front-end web server 302 can generate a unique request identifier for the client request 314, and can store the request identifier along with information about the client device 102 to allow the front-end web server to communicate data back to the client device 102. For example, the front-end web server 302 can store HTTP (Hypertext Transfer Protocol) connection information to allow the front-end web server to communicate data (e.g. an object in the feature database 114 matching the image of the client request 314) in HTTP messages sent to the client device 102. Although reference is made to HTTP communications between the client device 102 and the front-end web server 302, it is noted that in other implementations, other types of communications can be performed.

Also, in other implementations, instead of using the web server 302, other types of interface devices can be used to communicate between the augmented reality server system 108 and the client device 102.

If there are multiple front-end web servers 302, then the different front-end web servers can receive client requests from multiple client devices in a distributed manner.

In response to the client request 314, the front-end web server 302 sends a request message 316 corresponding to the client request to a feature extractor 304. If there are multiple feature extractors 304, the front-end web server 302 can send the request message 314 to anyone of the multiple feature extractors 304. The request message 316 that is sent from the front-end web server 302 to the feature extractor 304 includes a key and a value. The key is the request identifier of the corresponding client request 314, while the value is the captured image that is associated with the client request 314.

The front-end web server 302 can also receive a result message 318 from a matching object grouper 312. The result message 318 contains a key (which is the request identifier of the client request 314), and a value that includes unique identifier(s) of the matched object(s) that have been determined by the augmented reality server system 108 as matching the image of the client request 314. If no match was found, then the value of the result message 318 can contain a predefined null value.

The front-end web server 302 can send the matching object(s) in the result message 318 back to the client device 102.

The feature extractor 304 receives the request message 316 from the front-end web server 302. As noted above, the request message 316 contains a key (which is the request identifier of the client request 314) and a value (which is the image associated with the client request 314). The feature extractor 304 extracts features from the image.

In some examples, the extracted features are point features. A point feature refers to an element that is extracted from a given image patch (which can have a predefined size, such as a 16×16 grid or other size). Within an image, a number of point features can be extracted. Examples of point features include SIFT (scale invariant feature transforms) features, SURF (speeded up robust features), and others. In other examples, instead of extracting point features, other types of features can be extracted from an image, such as edge features, blob features, and so forth.

The feature extractor 304 can apply a hashing function to each extracted feature, which produces a corresponding hash value. The production of the hash value constitutes a first stage of the feature matching process. The hash value of each extracted feature is used to map the corresponding extracted feature to a respective feature matcher 306. A second stage of the matching process is performed at the feature matchers 306.

In some examples, the hash value produced by the hash function can include multiple bits (e.g. 13 bits or a different number of bits), where each bit can represent the sign (positive sign or negative sign) of the difference between a pixel location on the respective feature patch of the image and a mean value of the feature patch. The sign of the difference can be a positive sign or a negative sign, such that a bit has a first value if the sign is positive, and a second different value if the sign is negative.

Alternatively, the hash function can apply a clustering technique, such as a K-means clustering technique. The clustering technique is applied to a predefined corpus of features. The hash value produced for each extracted feature of the image is the label of the closest cluster in the corpus of features. It is possible that more than one hash value is produced for each extracted feature, corresponding to proximity to multiple clusters, for example.

The extracted features of the image are then grouped by the respective hash values. Assuming that the extracted features of the image are grouped into multiple groups, then the feature extractor 304 can send multiple request messages 320 to respective feature matchers 306. Each request message 320 sent by the feature extractor 304 to a respective feature matcher 306 includes a key (which includes the corresponding feature hash value) and a respective value (which includes a list of one or multiple feature descriptors). For example, if the extracted features of the image are point features, then the feature descriptors in the request message 320 are used to describe such point features. In addition, for each feature identified by a feature descriptor in the list of the request message 320, the corresponding position in the image can also be included in the request message 320. Moreover, the request identifier of the client request 314 (as received by the front-end web server 302) can also be included in the request message 320.

The distribution of the request messages 320 from the feature extractor 304 is according to the keys (feature hash values) contained in the respective request messages 320. For example, a first request message 320 containing a first feature hash value is sent to a first feature matcher 306, a second request message 320 containing a second, different feature hash value is sent to a second, different feature matcher 306, and so forth.

In addition, the feature extractor 304 also sends a coordination message 322 to a feature match grouper 308. The coordination message 322 sent to the feature match grouper 308 includes a key (request identifier of the client request 314), and a value (which includes the number of request messages 320 sent from the feature extractor 304 to the feature matchers 306). The purpose of the coordination message 322 s to allow coordination between the feature matchers 306 and the feature match groupers 308 (discussed below).

The server that includes a feature matcher 306 (e.g. server 110-$i$ in FIG. 1, where i is selected from the range 1 to n) stores (or is able to access) the corresponding feature partition 112-$i$. The feature partitions are partitioned by feature hash values of the object features of the feature database 114. Each feature partition 112-$i$ can have multiple entries, where each entry includes a feature descriptor to describe the respective feature, a position of the feature in the respective object, and the unique identifier of the object.

A feature matcher 306 receives a request message 320 from a feature matcher 306. As noted above, the request message 320 contains a key (feature hash value) and a value (list of one or multiple feature descriptors).

In some examples, the feature matcher 306 can group features from multiple images (associated with multiple requests from one or multiple client devices 102). The grouped features from multiple images can share the same feature hash value. Grouping the features from multiple images can allow for more efficient usage of a memory or cache of the server 110-$i$. Grouping multiple features from multiple images can allow for such grouped images to be stored in higher-speed memory or cache of the server 110-$i$, such that the feature matching processes for the multiple images can be performed with a smaller number of accesses of relatively slow persistent storage. In other examples, the grouping of features of multiple images is not performed.

The feature(s) identified by the request message(s) 320 is (are) matched by the feature matcher 306 against the features of the corresponding feature partition 112-$i$.

Based on the matching, the feature matcher 306 then sends a result message 324 to a feature match grouper 308. The result message 324 can include a key (request identifier of the client request 314) and a value (which includes a list of one or multiple matching features and respective position(s) in the corresponding object(s), along with the respective object identifier(s)). Multiple result messages 324 are distributed by the feature matchers 306 to the feature match groupers by the keys of the result messages 324.

The feature match grouper 308 receives two types of messages: a coordination message 322 from the feature extractor 304, and a result message 324 from a feature matcher 306. As noted above, the coordination message 322 can include a key (request identifier) and a value (which includes a number of request messages 320 sent by the feature extractor 304 to feature matchers 306). The number of request messages 320 corresponds to a number of distinct feature hash values that were identified for the extracted features of the image associated with the client request 314. One coordination message 322 is received per request identifier.

The result message 324 received by the feature match grouper 308 from the feature matcher 306 includes a key (request identifier) and a value (list of one or multiple matching features and associated position(s) in the corresponding object(s), along with the respective object identifier(s)).

For a given request identifier (of the client request 314), if the feature match grouper 308 determines that the number of result messages 324 from the feature matchers 306 is equal to the number of request messages specified in the coordination message 322, then all matching features for the client request 314 are deemed to have been received by the feature match grouper 308 from the feature matchers 306. The feature match grouper 308 then groups the matching features for the client request 314 by object. In other words, the matching features for a given object are grouped together. If the matching features correspond to multiple objects, then there would be multiple corresponding groups of matching features.

One or multiple result messages 326 are then sent from the feature match grouper 308 to a geometric consistency matching module 310. Each result message 326 includes a key (object identifier of the respective object) and a value (request identifier plus list of one or multiple matching features). If there are multiple matching objects corresponding to the image of the client request 314, then there would be multiple result messages 326. However, if there is just one object corresponding to the image of the client request 314, then there would be just one result message 326 sent from the feature match grouper 308 to the geometric consistency matching module 310.

At this stage, the identified object(s) are considered to potentially match the image of the client request 314. The geometric consistency matching module 310 is used to determine whether the identified object(s), indicated in the result message(s) 326 from the feature match grouper(s) 308, actually match the image of the client request 314.

In addition, the feature match grouper 308 sends a coordination message 328 to the matching object grouper 312, where one coordination message 328 is sent for each request identifier. The key of the coordination message 328 is the request identifier, while the value of the coordination message 328 is the number of result messages 326 sent for the client request 314 (which corresponds to the number of objects that potentially match the image).

As noted above, the key of each result message 326 received by the geometric consistency matching module 310, is the object identifier, and the value includes the request identifier plus a list of one or multiple matching features. A geometric consistency technique is executed by the geometric consistency matching module 310. An example of a geometric consistency matching technique includes a RANSAC (RANdom SAmple Consensus) technique. The geometric consistency matching technique is able to determine a number of consistent matches between features of the image and features of the corresponding object. This number can be used to derive a match score, which can be compared to a specified threshold to determine whether there is an actual match between the image and the object.

The geometric consistency matching module 310 then sends a result message 330 to the matching object grouper 312. The key of the result message 330 is the request identifier, while the value includes an object identifier and a match score (where a predefined value, such as zero or another value, can be used to denote no match). The result message 330 is distributed to one of multiple matching object groupers 312 by the key of the result message 330.

If there are multiple objects that match the image, then multiple respective result messages 330 are sent to the matching object grouper 312. The number of the result message 330 is equal to the number of result messages 326 sent from the feature match grouper(s) 308 to the geometric consistency matching module 310.

The object match grouper 312 receives two types of messages: a coordination message 328 from the feature match grouper 308, and a result message 330 from the geometric consistency matching module 310. For a given request identifier, when the number of result messages 330 received from the geometric consistency matching modules 310 is equal to the number of objects with potential matches (as indicated by the coordination message 328), processing for the client request 314 is deemed to be complete. The matching objects for the request identifier are selected for inclusion in the result message 318 sent from the matching object grouper 312 to the front-end web server 302.

In some implementations, matching objects associated with match scores above the specified threshold are incorporated by the matching object grouper 312 into the result message 318. Alternatively, the first matching object is selected, or the matching object with the highest match score is selected for inclusion in the result message 318. The result message 318 is sent from the matching object grouper 312 to the front-end web server 302, where this result message 318 includes a key (request identifier) and a value (including the match result that identifies the object(s) determined to match the image of the client request 314).

Figure 4:
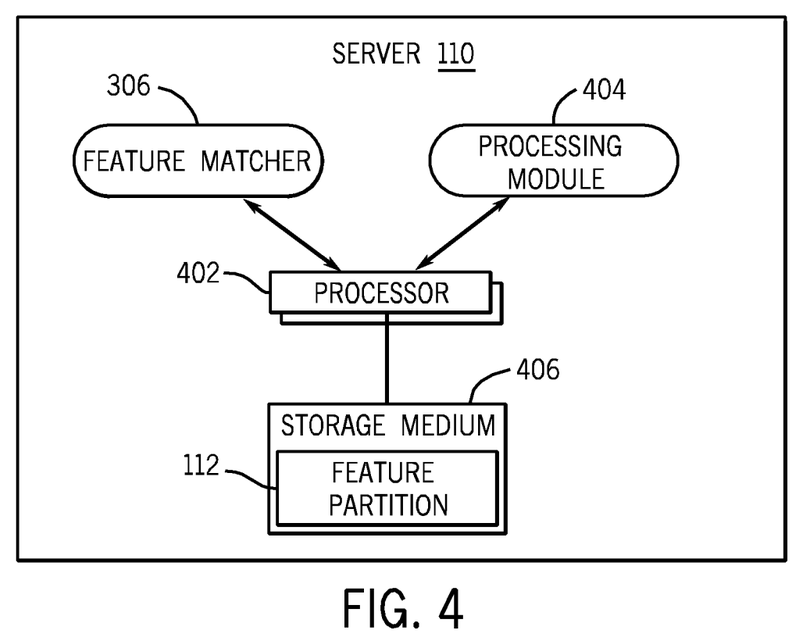
FIG. 4 is a block diagram of an example server according to some implementations.

FIG. 4 is a block diagram of an example server 110, in accordance with some implementations. The server 110 can be any of the servers 110-1 to 110-n in FIG. 1. The server 110 includes a feature matcher 306, which can be implemented as machine-readable instructions executable on one or multiple processors 402. In addition to the feature matcher 306, the server 110 can include at least one other processing module 404, which can also be implemented as machine-readable instructions executable on the processor(s) 402. The processing module(s) 404 can include any one or combination of the following: front-end web server 302, feature extractor 304, feature match grouper 308, geometric consistency matching module 310, and matching object grouper 312. Alternatively, the processing module 404 can be executed in another server.

A processor can include a microprocessor, microcontroller, processor module or subsystem, programmable integrated circuit, programmable gate array, or another control or computing device.

The server 110 also includes a storage medium (or storage media) 406, which can be used to store a respective feature partition 112 (which can be one of the feature partitions 112-1 to 112-n in FIG. 1). The storage medium (or storage media) 406 can be implemented as one or more computer-readable or machine-readable storage media. A storage medium can include any of different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   partitioning a feature database containing features of objects into a plurality of partitions provided at corresponding servers comprising processors, wherein features of one of the objects are provided across multiple partitions of the plurality of partitions;
   grouping features of captured visual data of a physical target received from an electronic device into a plurality of groups of features;
   sending, to a feature match grouper executed on a server comprising a processor, a message including a value indicating a number of the plurality of groups of features;
   matching, by feature matchers at the corresponding servers, respective groups of the plurality of groups of features of the captured visual data with features of the plurality of partitions;
   sending, by each of the feature matchers, a result of the matching to the feature match grouper, the result identifying at least one matching feature;
   in response to determining that the feature match grouper has received a number of the results from the feature matchers that is equal to the number indicated in the message, grouping, by the feature match grouper, matching features from the results by object of the feature database;

identifying, based on the grouped matching features, an object that corresponds to the captured visual data; and sending, to the electronic device, information relating to the identified object for triggering an augmented reality presentation at the electronic device.

2. The method of claim 1, further comprising applying a geometric consistency matching process to the grouped matching features of a corresponding object to determine a match score.

3. The method of claim 1, wherein the results identify matching features associated with plural objects, and wherein the grouping of the matching features produces a first group of matching features associated with a first of the plural objects, and a second group of matching features associated with a second of the plural objects.

4. The method of claim 3, further comprising:
determining a match score for each of the plural objects; and
using the match scores to determine which of the plural objects is a match for the captured visual data.

5. The method of claim 1, further comprising:
extracting the features of the captured visual data received from the electronic device; and
sending different subsets of the extracted features to different servers of the corresponding servers for matching to features in the corresponding partitions at the servers.

6. The method of claim 5, further comprising:
applying a function on the extracted features of the captured visual data to produce respective values, wherein the extracted features are distributed across the corresponding servers according to the values.

7. The method of claim 1, wherein the captured visual data comprises one of a captured image of the physical target and a captured video of the physical target.

8. The method of claim 1, further comprising:
sending, to the feature matchers, respective messages, each message of the messages sent to the feature matchers including information of a respective group of the plurality of groups of features,
wherein the value included in the message sent to the feature match grouper is a number of the messages sent to the feature matchers.

9. The method of claim 1, further comprising:
grouping, by a particular feature matcher of the feature matchers, features of different objects;
storing the grouped features of the different objects into a cache,
wherein the matching performed by the particular feature matcher uses the grouped features in the cache.

10. An article comprising at least one non-transitory machine-readable storage medium storing instructions that upon execution cause a system to:
extract features of captured visual data of a physical target from an electronic device;
group the extracted features into a plurality of groups of extracted features;
send, to a feature match grouper, a message including a value indicating a number of the plurality of groups of extracted features;
distribute the plurality of groups of extracted features across a plurality of servers;
match, by feature matchers in the servers, respective groups of the plurality of groups of extracted features with features of respective feature partitions at corresponding servers of the plurality of servers, wherein the feature partitions contain features of objects to be matched to the captured visual data, and wherein the features of one of the objects are provided across multiple ones of the feature partitions;
send, by each of the feature matchers, a result of the matching to the feature match grouper, the result identifying at least one matching feature;
in response to determining that the feature match grouper has received a number of the results from the feature matchers that is equal to the number indicated in the message, group, by the feature match grouper, matching features from the results by object of the feature database;
identify, based on the grouped matching features, an object that corresponds to the captured visual data; and
cause presentation of an augmented reality presentation at the electronic device based on the identified object.

11. The article of claim 10, wherein the matching comprises:
a first of the servers identifying a first matching feature of a given object that matches a corresponding extracted feature of the captured visual data; and
a second of the servers identifying a second matching feature of the given object that matches another corresponding extracted feature of the captured visual data.

12. The article of claim 10, wherein the instructions upon execution cause the system to further:
send, to the feature matchers, respective messages, each message of the messages sent to the feature matchers including information of a respective group of the plurality of groups of extracted features,
wherein the value included in the message sent to the feature match grouper is a number of the messages sent to the feature matchers.

13. The article of claim 10, wherein the instructions upon execution cause the system to further:
group, by a particular feature matcher of the feature matchers, features of different objects;
store the grouped features of the different objects into a cache,
wherein the matching performed by the particular feature matcher uses the grouped features in the cache.

14. A system comprising:
non-transitory storage media to store a plurality of feature partitions of a feature database, the feature partitions containing features of objects, wherein features of one of the objects are distributed across multiple ones of the feature partitions;
at least one processor;
a feature match grouper executable on the at least one processor;
instructions executable on the at least one processor to:
group features of captured visual data of a physical target received from an electronic device into a plurality of groups of features, and
send, to the feature match grouper, a message including a value indicating a number of the plurality of groups of features; and
a plurality of computer servers associated with corresponding feature partitions of the plurality of feature partitions, wherein the plurality of computer servers are to match respective groups of the plurality of groups of features to features of the corresponding feature partitions, and send, by each of the computer servers to the feature match grouper, a result of the matching, the result identifying at least one matching feature;

wherein the feature match grouper is executable on the at least one processor to, in response to determining that the feature match grouper has received a number of the results from the computer servers that is equal to the number indicated in the message, group, by the feature match grouper, matching features from the results by object of the feature database, and wherein the instructions are executable on the at least one processor to further:

identify, based on the grouped matching features, an object that corresponds to the captured visual data, and cause presentation of an augmented reality presentation at the electronic device based on the identified object.

15. The system of claim 14, wherein the instructions are executable on the at least one processor to further:

send, to the computer servers, respective messages, each message of the messages sent to the computer servers including information of a respective group of the plurality of groups of features, wherein the value included in the message sent to the feature match grouper is a number of the messages sent to the computer servers.

16. The system of claim 14, wherein a particular computer server of the computer servers includes a cache, and wherein the particular computer server is to group features of different objects, and store the grouped features of the different objects into the cache, wherein the matching performed by the particular computer server uses the grouped features in the cache.

* * * * *

UNITED STATES PATENT AND TRADEMARK OFFICE
CERTIFICATE OF CORRECTION

PATENT NO. : 9,767,362 B2
APPLICATION NO. : 14/649633
DATED : September 19, 2017
INVENTOR(S) : George Saklatvala Page 1 of 1

It is certified that error appears in the above-identified patent and that said Letters Patent is hereby corrected as shown below:

In the Drawings

In Fig. 2, sheet 2 of 4, reference numeral 206, Line 2, delete "correspnds" and insert -- corresponds --, therefor.

Signed and Sealed this
Thirteenth Day of March, 2018

Andrei Iancu
*Director of the United States Patent and Trademark Office*